(12) United States Patent
Sørensen

(10) Patent No.: US 10,256,705 B2
(45) Date of Patent: Apr. 9, 2019

(54) METHOD FOR REPAIRING AN ELECTRIC GENERATOR HAVING A ROTOR CONNECTING RING WITH CONDUCTIVE ARC SEGMENTS

(71) Applicant: Vestas Wind Systems A/S, Aarhus N. (DK)

(72) Inventor: Kim Sveinsson Sørensen, Ry (DK)

(73) Assignee: Vestas Wind Systems A/S, Aarhus N. (DK)

( * ) Notice: Subject to any disclaimer, the term of this patent is extended or adjusted under 35 U.S.C. 154(b) by 79 days.

(21) Appl. No.: 15/307,967

(22) PCT Filed: May 21, 2015

(86) PCT No.: PCT/DK2015/050125
§ 371 (c)(1),
(2) Date: Oct. 31, 2016

(87) PCT Pub. No.: WO2015/192850
PCT Pub. Date: Dec. 23, 2015

(65) Prior Publication Data
US 2017/0098984 A1    Apr. 6, 2017

(30) Foreign Application Priority Data
Jun. 18, 2014  (DK) .................................. 2014 70364

(51) Int. Cl.
*H02K 15/00* (2006.01)
*H02K 3/51* (2006.01)
(Continued)

(52) U.S. Cl.
CPC ........... *H02K 15/0068* (2013.01); *H02K 3/51* (2013.01); *H02K 3/527* (2013.01); *H02K 5/225* (2013.01);
(Continued)

(58) Field of Classification Search
CPC ............... H02K 15/0068; H02K 15/00; H02K 15/0066; H02K 3/51; H02K 3/527;
(Continued)

(56) References Cited

U.S. PATENT DOCUMENTS

2003/0042810 A1\* 3/2003 Tornquist ............. H02K 11/042
                                                                310/71
2003/0178896 A1 9/2003 Crane
(Continued)

FOREIGN PATENT DOCUMENTS

WO        2007100620 A1    9/2007

OTHER PUBLICATIONS

Danish Patent and Trademark Office, Search Report in DK Application PA 2014 70364, dated Jan. 16, 2015.
(Continued)

*Primary Examiner* — Michael Andrews
(74) *Attorney, Agent, or Firm* — Wood Herron & Evans LLP

(57) ABSTRACT

The invention relates to a method for repairing an electric generator, preferably in a wind turbine generator (WTG), the electric generator (10) having a stator and a rotor (30) rotatably mounted relative to the stator. The method of repairing the electric generator provides a rotor connecting ring (40) with a first conductor assembly and a second conductor assembly in two different planes, each assembly with a plurality of conductive arc segments. Each of the first and the second plurality of conductive arc segments form a ring-like shape in their respective plane, both ring-like shapes being concentrical to the central shaft (132) when the rotor connecting ring is mounted. First electrical connections (50) from the central shaft connect to the rotor connecting ring for the multiple phases (K,L,M). Second electrical connections (60) further connect from the rotor
(Continued)

connecting ring to the respective windings of the multiple phases (K,L,M) on the exterior part of the rotor facing the stator. The rotor connecting ring enhances rotational and thermal stability of the electric generator.

16 Claims, 11 Drawing Sheets

(51) Int. Cl.
    *H02K 3/52*     (2006.01)
    *H02K 5/22*     (2006.01)
    *H02K 7/18*     (2006.01)

(52) U.S. Cl.
    CPC ........... *H02K 7/183* (2013.01); *H02K 7/1838* (2013.01); *H02K 15/00* (2013.01); *H02K 15/0006* (2013.01); *H02K 2203/09* (2013.01); *Y02E 10/725* (2013.01)

(58) Field of Classification Search
    CPC ...... H02K 7/183; H02K 7/1838; H02K 5/225; H02K 2203/09; Y02E 10/725
    USPC .......................................................... 310/71
    See application file for complete search history.

(56) References Cited

U.S. PATENT DOCUMENTS

2004/0251752 A1* 12/2004 Shinzaki ................ H02K 3/522
    310/71
2007/0080592 A1    4/2007  Ohta et al.
2007/0278797 A1   12/2007  Flannery et al.

OTHER PUBLICATIONS

European Patent Office, International Search Report and Written Opinion in PCT Application No. PCT/DK2015/050125, dated Dec. 10, 2015.

\* cited by examiner

METHOD FOR REPAIRING AN ELECTRIC GENERATOR HAVING A ROTOR CONNECTING RING WITH CONDUCTIVE ARC SEGMENTS

FIELD OF THE INVENTION

The present invention relates to a method for repairing an electric generator, the invention also relates to an electric generator, preferably for use in a wind turbine generator (WTG). The invention further relates to a corresponding wind turbine generator.

BACKGROUND OF THE INVENTION

Wind power as a source of green and abundant energy is often suggested as one of the most promising power sources and has acquired a great momentum across the world. In the last few decades, wind turbines with different generators have been developed to increase the maximum power capture, minimize the cost, and expand the use of the wind turbines in both onshore and offshore applications.

Wind turbines, or wind turbine generators (WTGs), have over the past decades therefore experienced an increasing importance in electrical power production, and this growth of power generated from WTGs is expected to continue due to the world-wide transition from fossil fuel, i.e. coal, oil, and gas, to more climate-neutral electricity production.

A wind turbine converts wind power into electrical energy through an electric generator driven by the blades of the wind turbine under windy conditions. In some wind turbines, the electric generator comprises a stator and a rotor both having multiphase windings, such as a double-fed induction generator (DFIG), a cascade-regulated generator, an induction or a synchronic generator, or a DC generator.

When having a rotor rotating in relation to a stator of a generator, electricity has to be transferred to or from the rotor. Electricity may be transferred by means of a slip ring assembly also called a rotary electrical interface, rotating electrical connector, collector, or swivel or electrical rotary joint, enabling the rotor to receive or return electricity while rotating in relation to the stator. When having a rotor with a multiphase winding, a control system within the wind turbine is able to regulate the frequency, so that the wind turbine produces at a predetermined frequency, e.g. approximately 50 Hz.

For a wind turbine with a doubly fed induction generator (DFIG), the rotor cables from the central part of the rotating shaft must be electrically connected to the rotor windings (normally 3 phases) on the periphery of the rotor. Due to the heating of the rotor, cables from high current and the high rotational speed of the rotor special precautions are necessary.

The rotor cables are normally fixed by bolts and similar means, but experience shows that this configuration is not stable enough under prolonged operation and critical failures have in fact occurred from this resulting in a complete standstill of some WTGs. Due to the recent year's growth in number of installed WTGs and the corresponding importance for the power production, such standstill for a prolonged period of time is highly undesirable.

Hence, an improved method for repairing an electric generator would be advantageous, and in particular a more efficient and/or reliable method would be advantageous.

Object of the Invention

It is a further object of the present invention to provide an alternative to the prior art.

In particular, it may be seen as an object of the present invention to provide a method of repairing electric generators that solves the above mentioned problems of the prior art with critical failures.

SUMMARY OF THE INVENTION

Thus, the above described object and several other objects are intended to be obtained in a first aspect of the invention by providing a method for repairing an electric generator, preferably in a wind turbine generator (WTG), the electric generator comprising:

a stator having windings that form multiple stator phases (U,V,W), and a rotor being rotatably mounted relative to the stator in the electric generator, the rotor having windings forming multiple rotor phases (K,L,M) on the exterior part of the rotor facing the stator, the rotor having electrical pathways through a central shaft and outwards to the multiple phases (K,L,M), the method of repairing the electric generator comprising:

1) providing a rotor connecting ring, the rotor connecting ring comprises a first conductor assembly and a second conductor assembly in two different planes, the first conductor assembly and the second conductor assembly having a first plurality and a second plurality, respectively, of conductive arc segments, each of the first and the second plurality of conductive arc segments forming a ring-like shape in their respective plane, both ring-like shapes being concentrical to the central shaft when the rotor connecting ring is mounted, 2) providing first electrical connections from the central shaft of the rotor to the rotor connecting ring for the multiple phases (K,L,M), and 3) providing second electrical connections further from the rotor connecting ring to the respective windings of the multiple phases (K,L,M) on the exterior part of the rotor facing the stator, wherein the first electrical connections, the intermediate rotor connecting ring, and the second electrical connections upon mounting in the generator, facilitate electrical pathways from the central shaft of the rotor to the corresponding multiple phases (K,L,M) on the rotor.

The invention is particularly, but not exclusively, advantageous for providing an improved method of repairing electric generator where electricity is to be transferred to the windings of the rotor. Because of the rotor connecting ring according to the present invention, the electric connections are significantly more stable, and tests performed by the applicant have demonstrated that particularly the thermal stability is improved as compared to previously applied wire connections from the central shaft to the multiple windings. At some critical locations in the electric generator, the applicant has observed a significant decrease in temperature, up to 20 degrees, by using the present invention.

The term 'arc segment' may be interpreted broadly as a curved path or segment of conductive material with a width and height suitable for carrying the electricity to the connected phase on the rotor. It may particularly be a circular arc segment but other forms are also contemplated within the context of the present invention, e.g. polygons (triangles, squares, etc.). Advantageously, the conductive arc segments are electrically isolated from each other to avoid short circuiting. This may be obtained if each of the first and the second conductor assembly are embedded in an insulating ring member with corresponding recesses for receiving the conductive arc segments. The ring-like shape of the conductor assemblies is overall formed by the shape of the arc segments. In some embodiments, the ring-like shape resembles a circle with a radial extension.

The ring-like shape of the first and/or the second conductor assembly may cover substantially the entire circumference of the rotor connecting ring as seen from the central shaft. More specifically, each assembly may cover an angular extension of 90%, preferably 95, more preferably 98% etc., the higher coverage having a positive impact on the rotational stability of the ring.

In one embodiment, the number of arc segments in each of the first and the second conductor assembly is equal to the number of phases (K, L, M) on the rotor, preferably the number of rotor phases and arc segments in each conductor assembly being equal to three. Alternatively, rotor phases may optionally be 2 or 4, 5 or 6, 7, 8, 9, 10 or higher depending on the application and context. Typically, the number of stator phases is equal to the number of rotor phases.

For advantageous electrical contact one, or more, of the conductive arc segments comprises a radially inwards pointing connection pad (as seen from the central shaft) for receiving and mounting of the corresponding first electric connection from the central shaft in order to carry the high current of the rotor phase. Additionally or alternatively, the one, or more, of the conductive arc segments may comprise a radially outwards pointing connection pad for receiving and mounting of the second electric connection for the corresponding rotor phase (K,L,M), which may support stable electric contact. Beneficially, the one, or more, conductive arc segments may have a radially inwards pointing connection pad placed at an angularly different position, relative to the central shaft, than a radially outwards pointing connection pad in order to align with the generator's electrical pathways, thereby providing rotational stability.

In one preferred embodiment, the number of arc segments may be three, but other number of arc segments may be 2, 4, 5, 6, 7, 8, 9, 10 and higher, depending on the context and application, in particular the number of different rotor phases to be supplied with electricity. The number of arc segments in the first and the second conductor assembly may be the same, or different. The arc segments may be made of a conducting material, such as a copper alloy or similar. The conducting material may be the same or different for the arc segments.

Advantageously, the angular position(s) of the radially outwards pointing connection pads on the one, or more, conductive arc segments facilitates that the corresponding second electric connection(s) can be mounted in a substantially radial direction towards the respective phase on the rotor (K,L,M), which is advantageous, in particular if the first and/or the second electric connections comprises electrically conducting wires suitable to rotational forces. Such wires may be mounted during repair on the corresponding connection pads, or may already be present in the generator.

The fixation and electrical contact of the first and second electrical connections with the rotor connecting ring during repair is particularly important. If wires or cables are used, fixation hereof may be performed with dedicated bolts and nuts, e.g. of the first and/or second electrical connections. Alternatively or additionally, other fixation method such as induction welding, silver welding, MIG welding, may be applied within the principle and teaching of the present invention. Specifically, the insulation class of such fixation may be a level higher than the generator itself, which is typically Insulation class H (rated up to 180 degrees Celsius). Advantageously, according to embodiments of the present invention, at least the second electrical connection is made without wires/cables.

In several embodiments, the method may comprise an initial step of removing previously wired first and second electrical connections from the central shaft to the rotor phases (K,L,M) i.a. to provide a possibility to perform the method of repairing according to the present invention.

In some embodiments, the central shaft of the rotor may comprise a rotary electrical interface providing a transition for the electrical pathways from outside the rotor to the rotating rotor, the electrical pathways on the rotating central shaft having exit positions on the shaft near the rotor phases, sometimes called a slip ring. Various rotary electrical interfaces are available, e.g. brush connected rotors etc. The said exit positions of the electrical pathways on the central shaft and the corresponding radially inwards pointing connection pads may have similar angular positions, relative to the central shaft, so as to facilitate that the first electric connections can be mounted in a substantially radial direction towards the radially inwards pointing connection pad to improve rotational stability.

The rotary electrical interface may comprise electric pathways along the rotational axis, which are, for example, electrically conducting cables. Alternatively, parts of the electrical pathways may be so-called conductor bars, which are more stable with respect to rotation.

Preferably, the radial extension of the first and the second conductor assembly, as measured from the centre of the rotating shaft, may be below 10%, preferably below 5%, of an average diameter of the rotor measured at the multiple phases (K,L,M), the limited radial extension being sufficient for good electric conductivity through the ring while not adding too much weight to the rotor.

In some embodiment, there may be more than two planes, or levels, of conductor assemblies. The assemblies may thus be stacked in several planes, the planes may be radially and/or angularly overlapping. The assemblies may be identical but shifted axially along the central shaft. The assemblies, and the corresponding ring-like shape may have same, similar or quite different diameter from each other.

In preferred embodiments, the rotor connecting ring is a single entity already assembled before the repair operation is started so as to lower the overall repair time.

Some Definitions

Repairing

The act of 'repairing' in the context of the present invention is to be interpreted as including, but not limited to, restoring by replacing part(s) with other part(s) to bring the electric generator into a functioning state. It need not be in an initial state of malfunctioning in order to be repaired, but could be improved by performing the method of repairing according to the present invention. The act of repairing could thus be interchangeably used with, or synonymously to, updating, upgrading, performing maintenance, performing service, etc.

Wind Turbine Generator (WTG)

In the context of the present invention, the term "wind turbine generator", or sometimes just "wind turbine" for short, should be considered to include, but is not limited to, a wind turbine generator (WTG) comprising one or more (rotor) blades which are rotatable, by action of the wind, around a horizontal axis mounted in a nacelle mounted on the uppermost part of an elongated tower. The nacelle itself is pivotal around a vertical axis in order to turn the rotor blade into a suitable aligned position with the wind direction. The one or more rotor blades is rotated at a speed which is depending on the wind and the aerodynamics of the rotor blades in order to drive an electric generator for converting wind energy into electric energy. In short, a wind turbine or wind turbine generator or wind generator or aerogenerator may be defined as a means for converting the kinetic energy of the wind into mechanical energy and, subsequently, into electric energy.

Electric Generator

An electric generator converts kinetic energy into electric energy. Various generators are available depending on the speed range, placement, cost, weight, size and power quality at the grid connection. Normally, electric generators are classified according to the principle of operation, possibly also the power level. Generally, AC machines, universal machines and DC machines are overall available mode of operation, but within the WTG industry primarily AC machines, preferably the poly-phase type, i.e. with multiple phases, are widely used. Within the poly-phase type, the generators may be further divided into induction generators and synchronous generators. For induction type generators, the squirrel-cage (fully feed, fixed speed, or multi-phase) and wound rotor (opti-speed, or doubly-fed) are options. For synchronous type generators, there are generally three options 1) wound field, 2) permanent magnet (PM) and 3) high temperature superconductor (HTS).

The present invention is particularly, but not exclusively, relevant for wound rotor induction generators, more particularly doubly fed induction generator (DFIG). For DFIGs, three sub-types are known: the conventional DFIG, the Brushless doubly fed induction generator (BDFIM), and the brushless doubly fed synchronous generator (BDFSM), all three being relevant within the context of the present invention. The present invention is also particularly, but not exclusively, relevant for synchronous generators of the wound field type.

In general, the present invention is particularly relevant for an electric generator where electric connections from outside the rotor are to be electrically connected with the windings of the rotor.

In a second aspect, the invention relates to an electric generator for converting mechanical energy into electric energy, preferably in a wind turbine generator (WTG), the electric generator comprising:
  a stator having windings that form multiple stator phases (U,V,W), and
  a rotor being rotatably mounted relative to the stator in the electric generator, the rotor having windings forming multiple rotor phases (K,L,M) on the exterior part of the rotor facing the stator, the rotor having electrical pathways through a central shaft and outwards to the multiple phases (K,L,M),
  a rotor connecting ring, the rotor connecting ring comprises a first conductor assembly and a second conductor assembly in two different planes, the first conductor assembly and the second conductor assembly having a first plurality and a second plurality, respectively, of conductive arc segments, each of the first and the second plurality of conductive arc segments forming a ring-like shape in their respective plane, both ring-like shapes being concentrical to the central shaft,
  first electrical connections from the central shaft of the rotor to the rotor connecting ring for the multiple phases (K,L,M), and
  second electrical connections from the rotor connecting ring to the respective windings of the multiple phases (K,L,M) on the exterior part of the rotor facing the stator,
wherein the first electrical connections, the intermediate rotor connecting ring, and the second electrical connections facilitate electrical pathways from the central shaft of the rotor to the corresponding multiple phases (K,L,M) on the rotor.

In a third aspect, the invention relates to a wind turbine generator (WTG) comprising an electric generator, the electric generator comprising:
  a stator having windings that form multiple stator phases (U,V,W), and
  a rotor being rotatably mounted relative to the stator in the electric generator, the rotor having windings forming multiple rotor phases (K,L,M) on the exterior part of the rotor facing the stator, the rotor having electrical pathways through a central shaft and outwards to the multiple phases (K,L,M),
  a rotor connecting ring, the rotor connecting ring comprises a first conductor assembly and a second conductor assembly in two different planes, the first conductor assembly and the second conductor assembly having a first plurality and a second plurality, respectively, of conductive arc segments, each of the first and the second plurality of conductive arc segments forming a ring-like shape in their respective plane, both ring-like shapes being concentrical to the central shaft,
  first electrical connections from the central shaft of the rotor to the rotor connecting ring for the multiple phases (K,L,M), and
  second electrical connections from the rotor connecting ring to the respective windings of the multiple phases (K,L,M) on the exterior part of the rotor facing the stator,
wherein the first electrical connections, the intermediate rotor connecting ring, and the second electrical connections facilitate electrical pathways from the central shaft of the rotor to the corresponding multiple phases (K,L,M) on the rotor.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The method according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
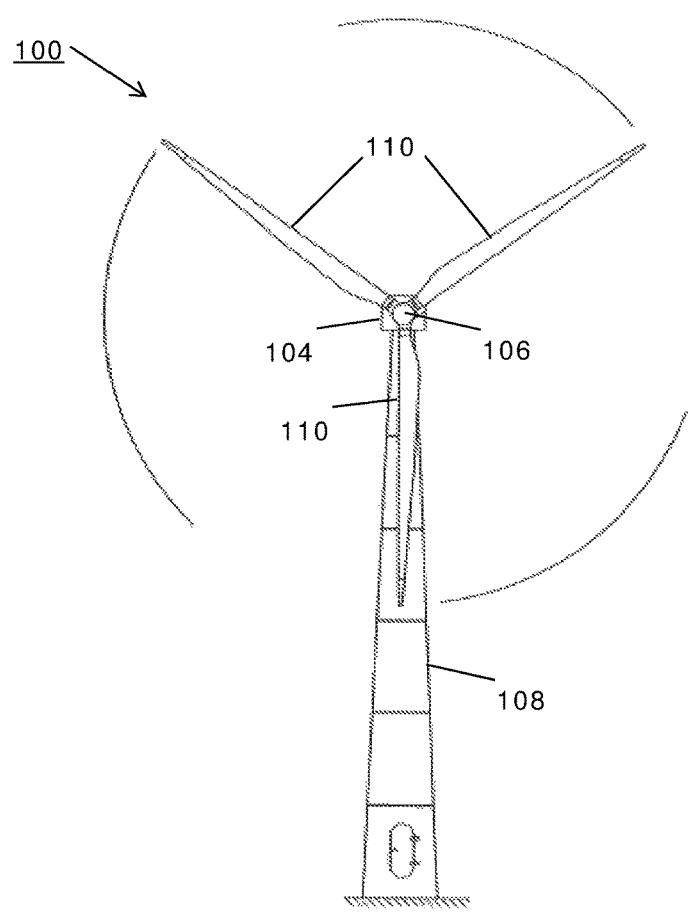
FIG. 1 is a schematic drawing of a wind turbine generator (WTG) according to the present invention.

FIG. 1 is a schematic drawing of a wind turbine generator (WTG) 100, as seen in a front view, according to the present invention. The WTG 100 comprises one or more rotatable mounted blades 110, e.g. three blades as shown in FIG. 1, connected to the nacelle 104 via a hub 106. The nacelle 104 is pivotally mounted on an upper portion of a tower 108. The rotor blades are rotated at a speed depending on the wind and the aerodynamics of the rotor blades in order to drive an electric generator (not shown in FIG. 1) for converting wind energy into electric energy.

Figure 2:
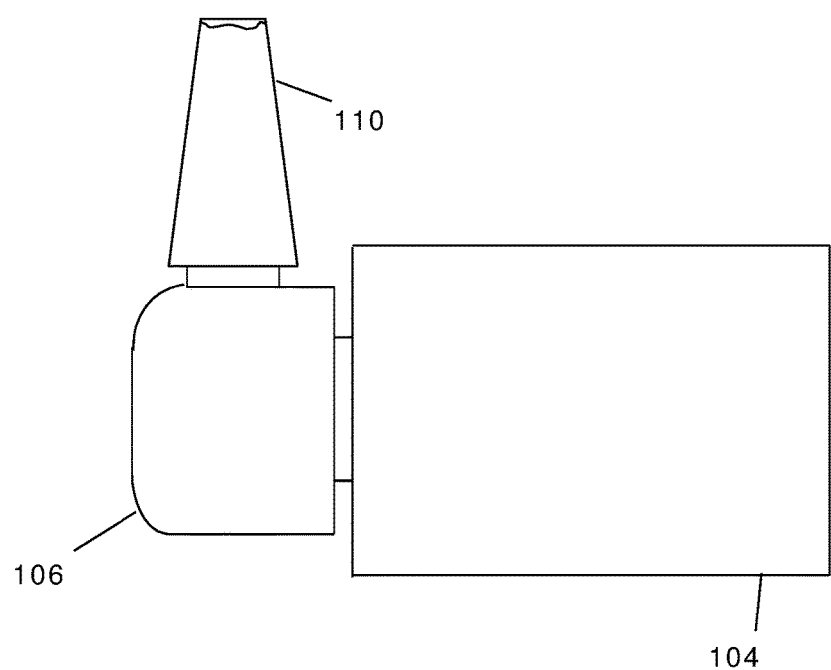
FIG. 2 is a side view of the nacelle of the WGT shown in FIG. 1.

FIG. 2 is a side view of the nacelle of the WGT from FIG. 1 showing the mechanical connection of the blade 110 (only one blade partly shown here) via the hub 106 into the nacelle 104. For further details on WTG design and applications, the skilled reader is referred, for example, to *Wind Turbines—Fundamentals, Technologies, Application, Economics* by Erich Hau (Springer Verlag, 2006). The blades 110 are generally called a primer mover in the field of generators.

Figure 3:
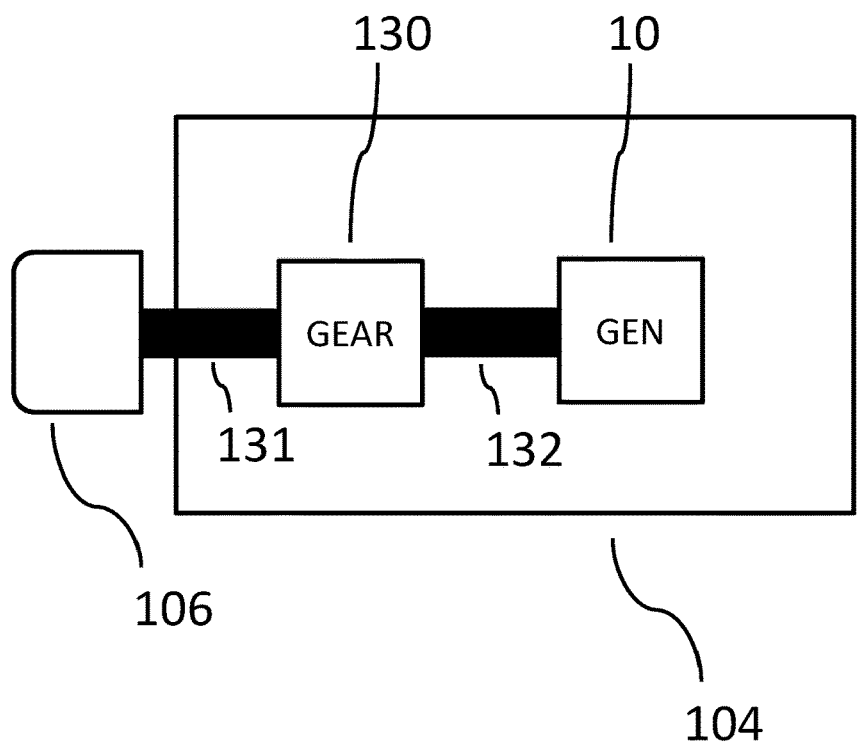
FIG. 3 is a schematic drawing of the mechanical drive train of the WTG with a gearbox and an electric generator according to the present invention.

FIG. 3 is a schematic drawing of the mechanical drive train of the WTG 100 shown in FIGS. 1-2 with an intermediate gearbox 130 'GEAR', and an electric generator 10 'GEN' according to the present invention. The mechanical drive train normally comprises the rotating parts from the hub 106 to the electric generator 10. A first rotating shaft 131 connected to the hub 106 is, in turn, further connected to a gearbox 130 that shifts the low rotational speed of the blades 110 significantly up and transmits the higher rotational speed via a second shaft 132 to the generator 10 where the rotational energy is converted electromagnetically into electric energy, e.g. by a doubly fed induction generator (DFIG), or other kinds of electric generators suitable for application in wind turbines considering the intrinsic variable nature of the wind normally working on the prime mover. Typical rotational speeds of the first shaft 131 are 10-20 rounds per minute (RPM) and 1000-1600 RPM for the second shaft 132. The shown drive train assembly where the first 131 and second 132 rotating shaft being aligned (though a parallel configuration is also possible), is a common configuration for WTG drive trains, but the present invention is not limited to this particular configuration of the mechanical drive train, e.g. the generator 10 may alternatively be vertically mounted via a gear directing rotating motion into an orthogonal direction, the generator and optionally the gearbox may alternatively be mounted in the tower foot, etc. The present invention may also be applied for a mechanical drive train with no gearbox.

Figure 4:
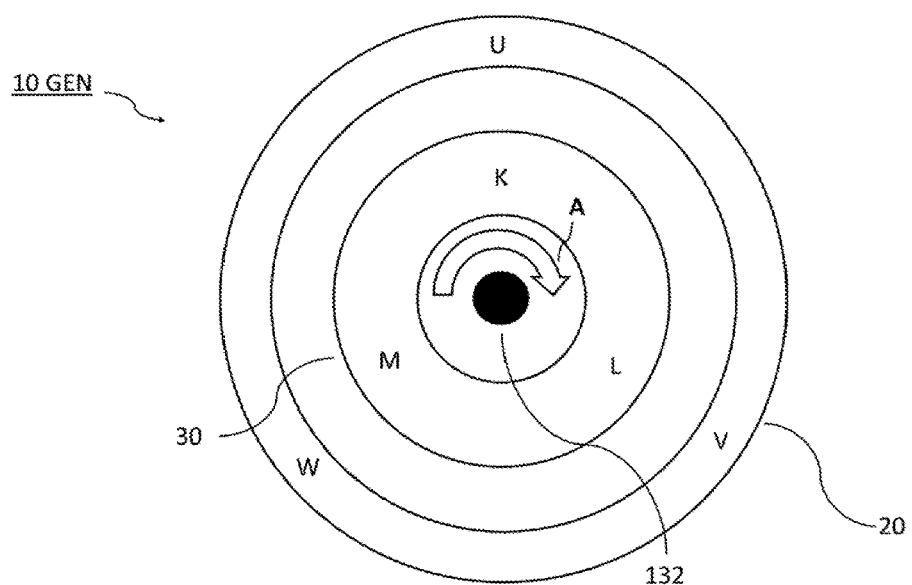
FIG. 4 is a schematic cross-sectional view of an electric generator according to the present invention.

FIG. 4 is a schematic cross-sectional view (as seen from the hub 106) of an electric generator 10 GEN according to the present invention, particularly of the doubly fed induction generator type, though the teaching and principle of the invention is applicable to any generator where the rotor 30 is to be supplied with electricity by electrical pathways or connections to the appropriate rotor parts, as it would be appreciated by the skilled person. The electric generator 10 is positioned in the wind turbine generator (WTG) within the nacelle 104 as explained in connection with FIGS. 1-3 above. The electric generator 10 comprises a stator 20 having windings that form multiple stator phases, conventionally labelled U, V, and W as indicated. For simplicity, the separation between the stator phases is not shown but the three phases have an equal share of the stator circumference, i.e. approximately 120 degrees, and can each be arranged in pole pairs with a north and south pole (not shown) oppositely arranged with 180 degrees between them on the stator circumference.

The rotor 30 is rotatably mounted relative to the stator 20 in the electric generator 10, as indicated by the arrow A, the rotor have windings forming multiple rotor phases as here indicated with three phases conventionally labelled K, L, and M on the exterior part of the rotor 30 facing the stator 20. Similarly to the stator phases, the three rotor phases can be arranged in pole pairs with a north and south pole (not shown), oppositely arranged with 180 degrees between them on the rotor circumference. In this way, the angular distance between the poles on the rotor will be 60 degrees (6 poles in total).

Though not directly influencing the present invention, it may be mentioned that the rotor configuration may be star or Delta connected (also known as Wye or Delta connected). Various rotor connections are contemplated within the context of the present invention, e.g. parallel or serial connected.

For further details on the rotor and stator phase configurations and possible variations thereof, the skilled reader is referred e.g. to the relevant sections of *Electrical Machines, Drives, and Power Systems* by Theodore Wildi (2002, Prentice Hall).

The rotor 30 has electrical pathways through the central shaft 132, e.g. via a slip ring (not shown), and outwards to the multiple phases K, L, and M, as the skilled person in electric generators will readily know and appreciate.

Figure 5:
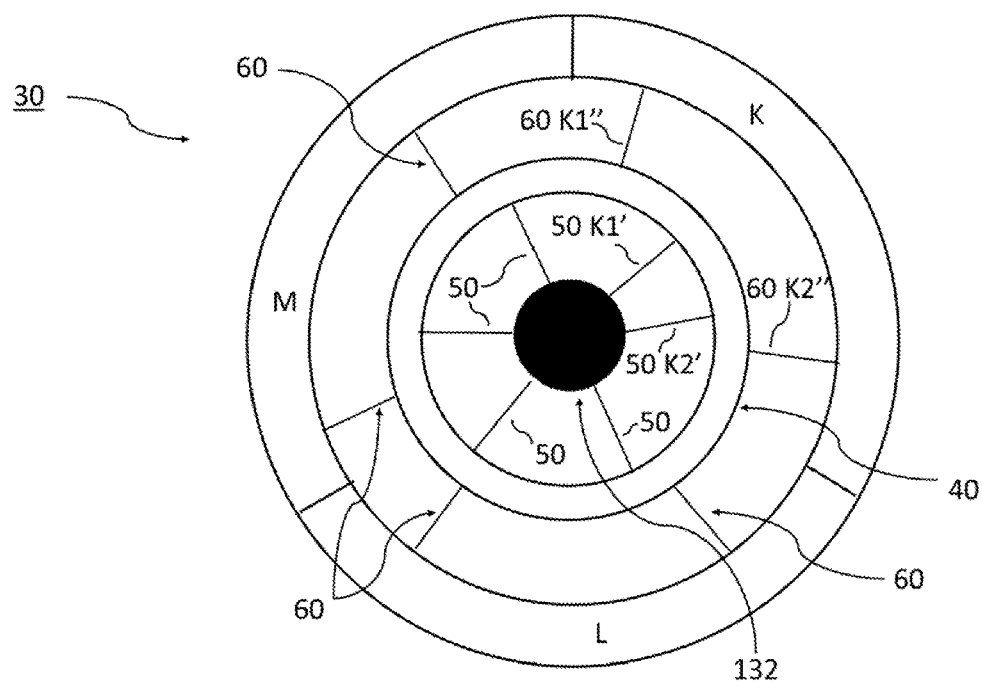
FIG. 5 is s a schematic cross-sectional view of a rotor of an electric generator according to the present invention.

FIG. 5 is s a schematic cross-sectional view of a rotor 30 of an electric generator according to the present invention. The rotor connecting ring 40 is shown in between the rotational shaft 132 and the three phases K, L, and M. Also schematically shown are first electrical connections 50, e.g. electrically conducting wires of for example a copper ally, more particular from the central shaft 132 of the rotor 30 to the rotor connecting ring 40 for the three phases K, L, and M. Two of the first electrical connections 50 are more particularly named K1' and K2' for indicating their relation to the rotor phase K on the periphery of the rotor 30. The two electrical connections K1' and K2' are both connected to the ring 40 but are electrically isolated from each other on the ring 40 as it will be explained in connection with FIG. 6 below. Similarly, the other first electrical connections 50 are electrically isolated from each on the rotor connecting ring 40.

FIG. 5 also shows second electrical connections 60 from the rotor connecting ring 40 to the respective windings of the multiple phases K, L, and M on the exterior part of the rotor 30. Again, two of the second electrical connections 60 are more particularly named K1" and K2" for indicating their relation to the rotor phase K on the periphery of the rotor 30.

In this embodiment, each of the phases, K, L, and M, are thus electrically connected with two electrical connections to form electrical pathways via the shaft to outside of the rotor, more particularly to appropriate control electronics (not shown) of the electric generator arranged for controlling the electricity on the individual rotor phases. Accordingly, the first electrical connections 50, the intermediate rotor connecting ring 40, and the second electrical connections will facilitate electrical pathways from the central shaft 132 of the rotor to the corresponding multiple phases, K, L and M, on the rotor upon mounting in the generator 30.

Figure 6:
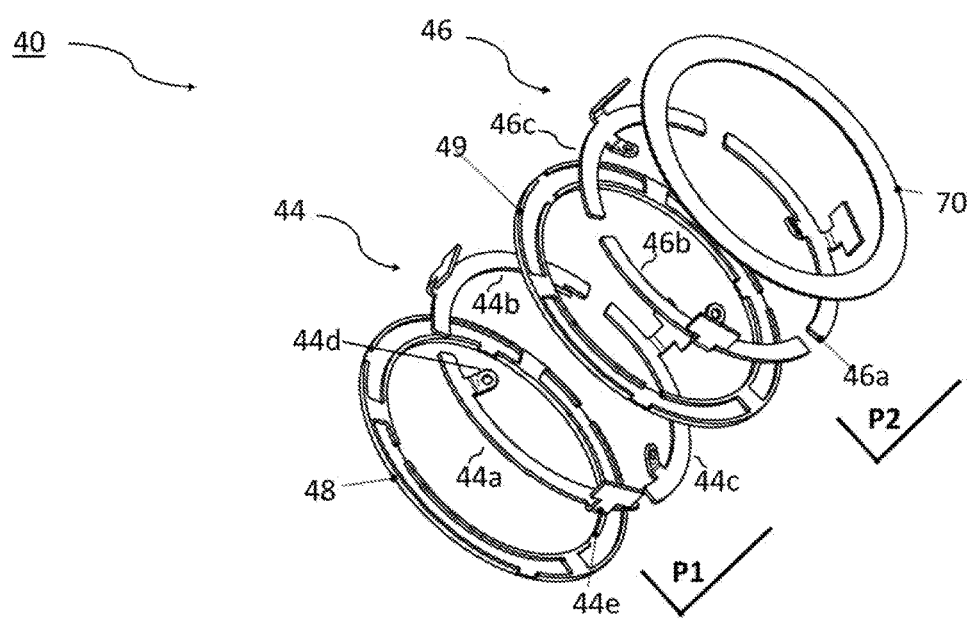
FIG. 6 is an exploded perspective drawing of a rotor connecting ring according to the present invention.

FIG. 6 is an exploded perspective drawing of a rotor connecting ring 40 according to the present invention. The rotor connecting ring comprises a first conductor assembly 44 and a second conductor assembly 46 in two different planes, as schematically indicated by partial planes P1 and P2. The planes P1 and P2 are parallel to each other to gain stability when rotating and for ease of mounting the ring 40.

The first conductor assembly and the second conductor assembly have a first plurality and a second plurality, respectively, of conductive arc segments 44a, 44b, and 44c, and 46a, 46b and 46c. Each of the first and the second plurality of conductive arc segments are forming a ring-like shape in their respective plane P1 and P2. Both ring-like shapes are concentrical to the central shaft 132 (not shown in FIG. 6 but see previous FIGS. 4 and 5) when the rotor connecting ring 40 is mounted enhancing the rotational stability of the ring 40 and the first and the second 60 electrical connections. In particular, it should be noted that the arc segments provide almost a full circle of a homogeneous material, e.g. a copper alloy, yielding by virtue of the design a balanced ring during the rotation.

The number of arc segments, 44a, 44b, and 44c, and 46a, 46b and 46c, in each of the first 44 and the second 46 conductor assembly, respectively, is here equal to the number of phases, K, L, M, on the rotor, i.e. the number of rotor phases and arc segments in each conductor assembly being equal to three.

The first 44 and the second 46 conductor assembly are to be embedded in insulating ring members 48 and 49 with corresponding recesses for receiving the conductive arc segments as seen in FIG. 6. The insulating ring member 48 or 49 can be manufactured in for example a glass-fibre reinforced composite material (e.g. Petimax or similar), preferably with fire-inhibiting material as conventionally used for electric generators.

The conductive arc segment 44a comprises a radially inwards pointing connection pad 44d for receiving and mounting of the corresponding first electric connection from the central shaft 132, pad having a hole for corresponding bolt fixation and connection. Similarly, the conductive arc segment 44a comprises a radially outwards pointing connection pad 44e for receiving and mounting of the second electric connection 50 for the corresponding rotor phase. The other conductive arc segment 44b and 44c, and 46a, 46b and 46c, have similar radially inwards and outward pointing pads as seen in FIG. 6, though not numbered for clarity in the Figure.

It is also worth emphasizing that from an electrical point of view the radially inward and outwards pointing connection pads, e.g. pads 44d and 44e, are positioned at distinctive angular positions (as seen from the central shaft) but they are not positioned at the extreme end of the arc segment 44a, which point to the fact that these extreme parts of the arc segment, i.e. not positioned between the pads, may be superfluous. However, from a rotational stability point of view they are not superfluous because the ring 40 is thereby stabilised. It is also contemplated that the extra material of conducting material of the arc segment contribute to the thermal stability because it can act as a heat reservoir in case of heating.

On top of the exploded view in FIG. 6 is shown a closing ring 70, which is intended for final mounting and insulation of the ring 40. Like the ring insulating members 48 and 49, the closing ring 70 should be manufactured in an appropriate insulating and fire-inhibiting material.

Before mounting of the rotor connecting ring 40, the ring 40 is in an assembled condition i.e. the first and second conductor assembly are inserted into the corresponding insulating ring members 48 and 49 with the top ring 70 of FIG. 6 mounted. The method comprises an initial step of removing previously wired first and second electrical connections from the central shaft to the rotor phases K, L, and M.

Notice that the arc segments 46a, 46b and 46c are electrically isolated from each other by the insulating ring member 49. Though the arc segments are isolated from each other together they cover substantially the entire circumference of the rotor connecting ring 40 as seen from a central position where the central shaft is positioned upon mounting of the ring. For a cylindrical polar coordinate system in the centre with the z-axis parallel and coinciding with the centre of the central shaft 132, the arc segments of each conductor assembly may cover an angular coordinate (θ) of approximately above 90%, 95% or 98% of the 360 degrees.

Figure 7:
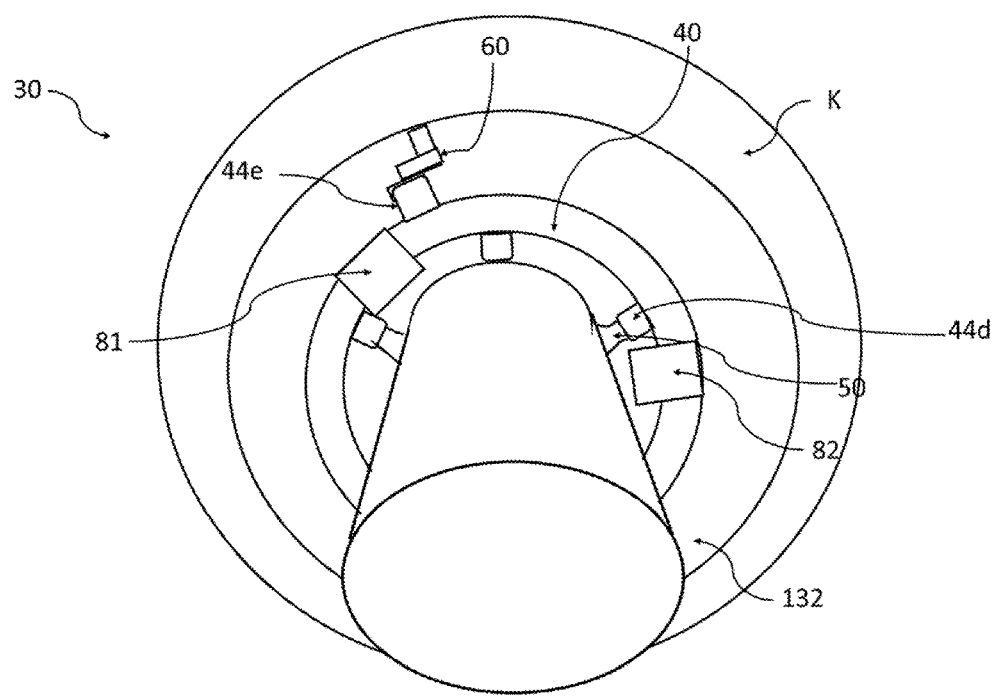
FIG. 7 shows a schematic perspective drawing of a rotor connecting ring when mounted according to the present invention.

FIG. 7 shows a schematic perspective drawing of a rotor connecting ring 40 when mounted in a rotor 30 according to the present invention. The ring 40 is fixated in mounting arrangements 81 and 82 specifically installed in the rotor during the repair operation with the purpose of keeping the ring in position during the high speed rotation of the rotor. First electrical connection 50 are seen to be—to a high extent—radially directed from the central shaft 132 towards the ring 40 where the electric wires are bolted to an inwardly pointing connection pad 44d. Second electrical connections 60 via radially outwardly connection pads to the rotor are also shown. Notice how these connection pads are bent to provide the best overlap relative to the second electrical connections 60 having opposing flat surfaces for their electrical connection.

The rotor in FIG. 7 may have an outer diameter of ca. 700 mm, the inner and outer diameter of the ring 40 being ca. 300 mm and ca. 270 mm, respectively. The first electrical connection 50, i.e. the conducting wires from the central shaft, should be sufficiently large to carry high current to the rotor phases (e.g. 1-2 kA) and accordingly cross-sections of about 50-200 $mm^2$, typically 90-120 $mm^2$, may be necessary. Corresponding dimensions of the conduction arc segments should be considered to avoid resistive loss and heating in the segments.

The ring 40 may be covered in cloth to provide additional fixation. The second electrical connection 60 may be also covered in a cloth to keep a support element in position to counter the action of the centrifugal forces during rotation.

Figure 8:
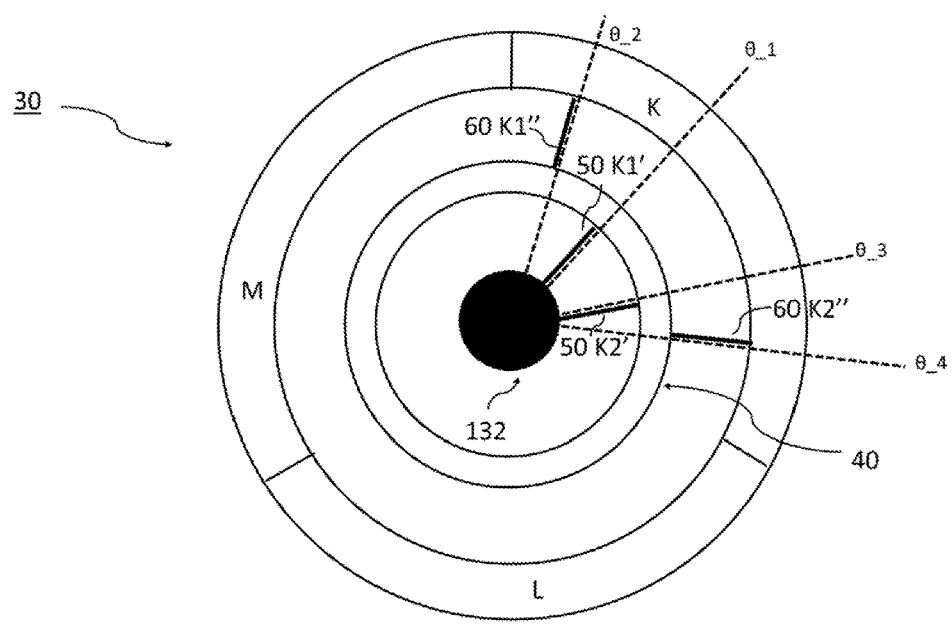
FIG. 8 is a schematic cross-sectional side view of a rotor of an electric generator according to the present invention.

FIG. 8 is a schematic cross-sectional side view of a rotor 30 of an electric generator according to the present invention similar to FIG. 5.

For reason of clarity, the radially inwards and outwards pointing connection pads are not directly shown here but, referring to FIGS. 5-7, they are positioned in suitable positions for the first 50 and the second 60 electrical connection.

It is to be understood that inwardly pointing connection pads can be placed at an angularly different position, as seen in a cylindrical polar coordinate system in the central shaft 132, than a radially outwards pointing connection pad i.e. the second electrical connection 60 K1" is positioned at θ_2 which is different from the angular position of the first electrical connection 50 K1' θ_1. Thus, the angular position of the radially outwards pointing connection pads on the corresponding conductive arc segment of the K phase facilitates that the corresponding second electric connection 60 K1" can be mounted in a substantially radial direction towards the respective phase K on the rotor 30 as schematically indicated.

The central shaft 132 of the rotor comprises a rotary electrical interface providing a transition for the electrical pathways from outside the rotor to the rotating rotor 30, the electrical pathways on the rotating central shaft having exit positions on the shaft near the rotor phases. These exit positions of the electrical pathways on the central shaft 132 and the corresponding radially inwards pointing connection pads have similar angular positions, i.e. θ_1 and θ_3 in FIG. 8, as seen in a cylindrical polar coordinate system in the central shaft 132, so as to facilitate that the first electric connections 50 can be mounted in a substantially radial direction towards the radially inwards pointing connection pad. Thus, when performing repairs the connector ring is preferably suited specifically to the rotor configuration and its electrical connections to the rotor phases.

Figure 9:
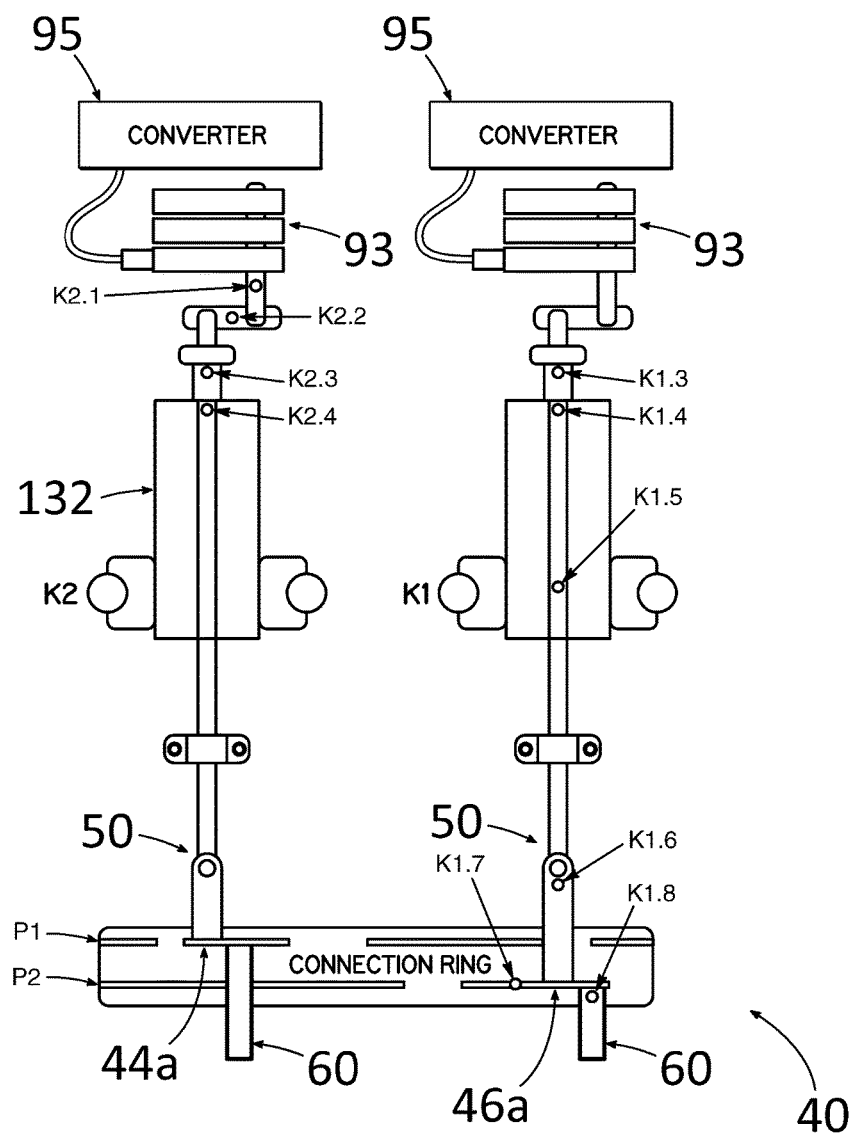
FIG. 9 is a schematically drawing showing the electrical pathways of one phase K.

FIG. 9 is a schematically drawing showing the electrical pathways of one phase K. The two pathways K1 and K2 are not shown as being connected to the rotor phase at the distal end for clarity, but the first 50 and second 60 electrical connection via the intermediate connecting ring 40 is shown. Notice how the K1 pathway is electrically connected via the ring 40 through arc segment 44a in plan P1, whereas the K2 pathway is electrically connected via the ring 40 through arc segment 46a in plan P2. Also shown schematically is the rotary electric interface 93 through the rotating shaft 132 from the converter 95, e.g. the so-called slip ring. The marked points within the K1 and K2 path followed by 0.1, 0.2, 0.3 etc. indicate points of temperature measurements performed by the applicant to demonstrate the effect of the present invention.

Figure 10:
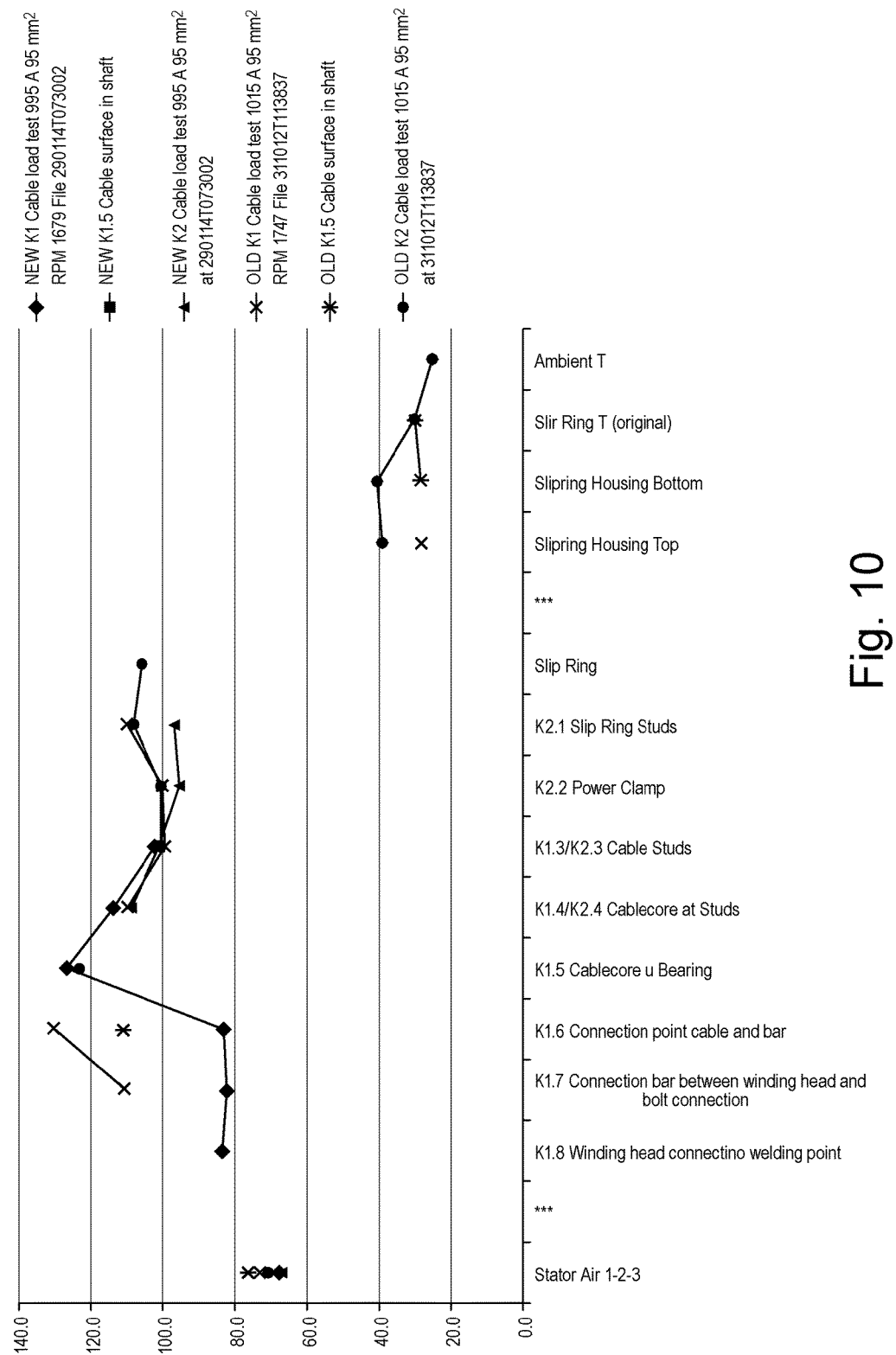
FIG. 10 is a graph showing the effect on the temperature of the rotor connecting ring according to the present invention.

FIG. 10 is a graph showing the effect on the temperature (degrees Celcius) of the rotor connecting ring according to the present invention at various positions in the generator. The legend term 'OLD' indicates temperature measurements without the present invention, and the legend term 'NEW' indicates temperature measurements made with the present invention mounted i.e. with a rotor connecting ring as explained above. It is seen that a significant reduction in temperature in particular at points K1.6 and K1.7 is caused by the present invention.

Figure 11:
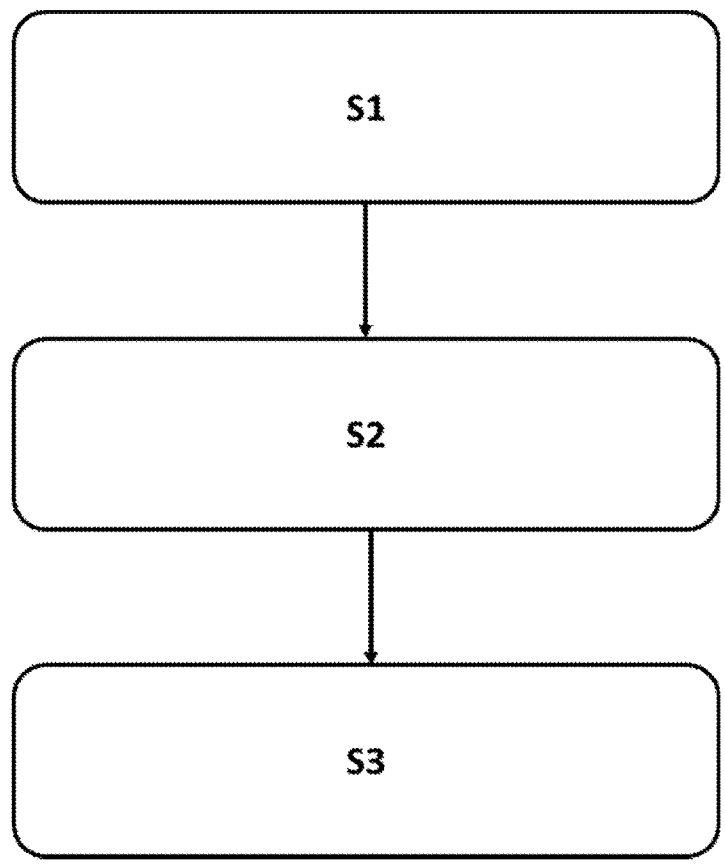
FIG. 11 is a flow-chart of a method according to the invention.

FIG. 11 is a flow-chart of a method according to the invention i.e. a method for repairing an electric generator 10, preferably in a wind turbine generator (WTG, as seen in FIG. 1, the electric generator comprising:
- a stator 20 having windings that form multiple stator phases U, V, and W, and
- a rotor 30 being rotatably mounted relative to the stator in the electric generator, the rotor having windings forming multiple rotor phases, K, L, and M, on the exterior part of the rotor facing the stator, the rotor having electrical pathways through a central shaft 132 and outwards to the multiple phases, K, L, and M, the method of repairing the electric generator comprising:
S1 providing a rotor connecting ring 40, the rotor connecting ring comprises a first conductor assembly 44 and a second conductor assembly 46 in two different planes, P1 and P2, the first conductor assembly and the second conductor assembly having a first plurality and a second plurality, respectively, of conductive arc segments, 44a, 44b, and 44c, and 46a,46b, and 46c, each of the first and the second plurality of conductive arc segments forming a ring-like shape in their respective plane, P1 and P2, both ring-like shapes being concentrical to the central shaft when the rotor connecting ring is mounted,
S2 providing first electrical connections 50 from the central shaft of the rotor to the rotor connecting ring for the multiple phases, K, L, and M, and
S3 providing second electrical connections 60 further from the rotor connecting ring to the respective windings of the multiple phases, K, L, and M, on the exterior part of the rotor facing the stator,
wherein the first electrical connections, the intermediate rotor connecting ring, and the second electrical connections, upon mounting in the generator, facilitate electrical pathways, e.g. K1 and K2, from the central shaft 132 of the rotor to the corresponding multiple phases, K, L, and M, on the rotor.

In short, the present invention relates to a method for repairing an electric generator, preferably in a wind turbine generator WTG, the electric generator 10 having a stator and a rotor 30 rotatably mounted relative to the stator. The method of repairing the electric generator provides a rotor connecting ring 40 with a first conductor assembly and a second conductor assembly in two different planes, each assembly with a plurality of conductive arc segments. Each of the first and the second plurality of conductive arc segments form a ring-like shape in their respective plane, both ring-like shapes being concentrical to the central shaft when the rotor connecting ring is mounted. First electrical connections 50 from the central shaft connect to the rotor connecting ring for the multiple phases, K, L, and M. Second electrical connections 60 further connect from the rotor connecting ring to the respective windings of the multiple phases, K, L, and M, on the exterior part of the rotor facing the stator. The rotor connecting ring enhances rotational and thermal stability of the electric generator.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for repairing an electric generator, preferably in a wind turbine generator, the electric generator comprising:
- a stator having windings that form multiple stator phases, and
- a rotor being rotatably mounted relative to the stator in the electric generator, the rotor having windings forming multiple rotor phases on the exterior part of the rotor facing the stator, the rotor having electrical pathways through a central shaft and outwards to the multiple phases, the method of repairing the electric generator comprising:
provinding a rotor connecting ring, the rotor connecting ring comprises a first conductor assembly and a second conductor assembly in two different planes, the first conductor assembly and the second conductor assembly having a first plurality and a second plurality, respectively, of conductive arc segments, each of the first and the second plurality of conductive arc segments forming a ring-like shape in their respective plane, both ring-like shapes being concentric to the central shaft when the rotor connecting ring is mounted, providing first electrical connections from the central shaft of the rotor to the rotor connecting ring for the multiple phases, and providing second electrical connections further from the rotor connecting ring to the respective windings of the multiple phases on the exterior part of the rotor facing the stator, wherein the first electrical connections, the intermediate rotor connecting ring, and the second electrical connections upon mounting in the generator, facilitate electrical pathways from the central shaft of the rotor to the corresponding multiple phases on the rotor.

2. The method according to claim 1, wherein the conductive arc segments are electrically isolated from each other.

3. The method according to claim 1, wherein each of the first and the second conductor assembly are embedded in an insulating ring member with corresponding recesses for receiving the conductive arc segments.

4. The method according to claim 1, wherein the ring-like shape of the first and/or the second conductor assembly cover substantially the entire circumference of the rotor connecting ring as seen from the central shaft.

5. The method according to claim 1, wherein the number of arc segments in each of the first and the second conductor assembly is equal to the number of phases on the rotor.

6. The method according to claim 1, wherein one, or more, of the conductive arc segments comprises a radially inwards pointing connection pad for receiving and mounting of the corresponding first electric connection from the central shaft.

7. The method according to claim 1, wherein one, or more, of the conductive arc segments comprises a radially outwards pointing connection pad for receiving and mounting of the second electric connection for the corresponding rotor phase.

8. The method according to claim 6, wherein one, or more, conductive arc segments have a radially inwards pointing connection pad placed at a different angular position, relative to the central shaft, than a radially outwards pointing connection pad.

9. The method according to claim 6, wherein the first and/or the second electric connection comprises electrically conducting wires, the wires being mounted, during repair, on the corresponding connection pads.

10. The method according to claim 8, wherein the angular position(s) of the radially outwards pointing connection pads on the one, or more, conductive arc segments facilitates that the corresponding second electric connection(s) can be mounted in a substantially radial direction towards the respective phase on the rotor.

11. The method according to claim 1, wherein the central shaft of the rotor comprises a rotary electrical interface providing a transition for the electrical pathways from outside the rotor to the rotating rotor, the electrical pathways on the rotating central shaft having exit positions on the shaft.

12. The method according to claim 6, wherein said exit positions of electrical pathways on the central shaft and the corresponding radially inwards pointing connection pads have similar angular positions, relative to the central shaft, so as to facilitate that the first electric connections can be mounted in a substantially radial direction towards the radially inwards pointing connection pad.

13. The method according to claim 1, wherein the radial extension of the first and the second conductor assembly, as measured from the centre of the rotating shaft, is below 10% of an average diameter of the rotor measured at the multiple phases.

14. The method according to claim 1, wherein the method comprises an initial step of removing previously wired first and second electrical connections from the central shaft to the rotor phases.

15. An electric generator for converting mechanical energy into electric energy, the electric generator comprising:
a stator having windings that form multiple stator phases, and
a rotor being rotatably mounted relative to the stator in the electric generator, the rotor having windings forming multiple rotor phases on the exterior part of the rotor facing the stator, the rotor having electrical pathways through a central shaft and outwards to the multiple phases,
a rotor connecting ring, the rotor connecting ring comprises a first conductor assembly and a second conductor assembly in two different planes, the first conductor assembly and the second conductor assembly having a first plurality and a second plurality, respectively, of conductive arc segments, each of the first and the second plurality of conductive arc segments forming a ring-like shape in their respective plane, both ring-like shapes being concentric to the central shaft,
first electrical connections from the central shaft of the rotor to the rotor connecting ring for the multiple phases, and
second electrical connections from the rotor connecting ring to the respective windings of the multiple phases on the exterior part of the rotor facing the stator,
wherein the first electrical connections, the intermediate rotor connecting ring, and the second electrical connections facilitate electrical pathways from the central shaft of the rotor to the corresponding multiple phases on the rotor.

16. A wind turbine generator comprising an electric generator, the electric generator comprising:
a stator having windings that form multiple stator phases, and
a rotor being rotatably mounted relative to the stator in the electric generator, the rotor having windings forming multiple rotor phases on the exterior part of the rotor facing the stator, the rotor having electrical pathways through a central shaft and outwards to the multiple phases,
a rotor connecting ring, the rotor connecting ring comprises a first conductor assembly and a second conductor assembly in two different planes, the first conductor assembly and the second conductor assembly having a first plurality and a second plurality, respectively, of conductive arc segments, each of the first and the second plurality of conductive arc segments forming a ring-like shape in their respective plane, both ring-like shapes being concentric to the central shaft, first electrical connections from the central shaft of the rotor to the rotor connecting ring for the multiple phases, and second electrical connections from the rotor connecting ring to the respective windings of the multiple phases on the exterior part of the rotor facing the stator, wherein the first electrical connections, the intermediate rotor connecting ring, and the second electrical connections facilitate electrical pathways from the central shaft of the rotor to the corresponding multiple phases on the rotor.

\* \* \* \* \*